Figure 1:
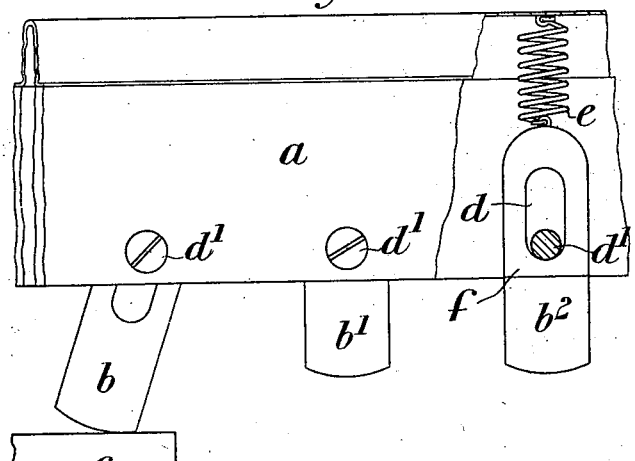

No. 728,659. PATENTED MAY 19, 1903.
B. H. BEDELL.
COLLECTOR FOR USE ON ELECTRICALLY PROPELLED OR LIGHTED VEHICLES.
APPLICATION FILED MAY 16, 1902.
NO MODEL. 2 SHEETS—SHEET 1.

Witnesses
John E. Bousfield.
C. G. Redfern.

Inventor
B. H. Bedell

No. 728,659. PATENTED MAY 19, 1903.
B. H. BEDELL.
COLLECTOR FOR USE ON ELECTRICALLY PROPELLED OR LIGHTED VEHICLES.
APPLICATION FILED MAY 16, 1902.
NO MODEL. 2 SHEETS—SHEET 2.
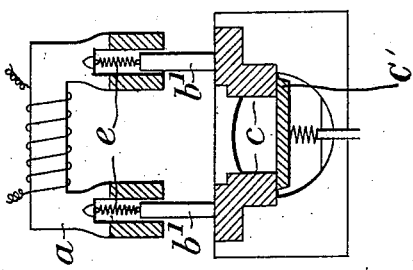
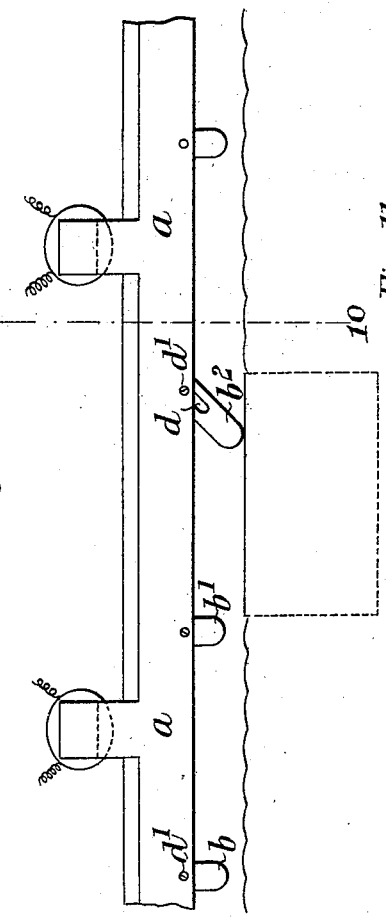
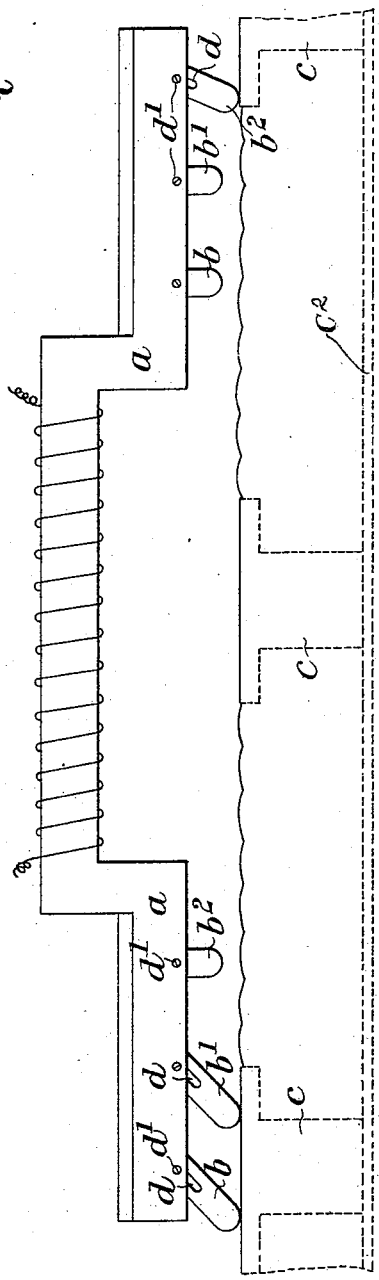
Witnesses
J. K. Moore
F. H. Hubbard
Inventor
Benjamin H. Bedell
By Whitaker & Prevost attys.

No. 728,659. Patented May 19, 1903.

UNITED STATES PATENT OFFICE.

BENJAMIN HARRY BEDELL, OF LONDON, ENGLAND, ASSIGNOR OF NINE-TENTHS TO WILLIAM GRIFFITHS, OF LONDON, ENGLAND.

COLLECTOR FOR USE ON ELECTRICALLY PROPELLED OR LIGHTED VEHICLES.

SPECIFICATION forming part of Letters Patent No. 728,659, dated May 19, 1903.

Application filed May 16, 1902. Serial No. 107,675. (No model.)

*To all whom it may concern:*

Be it known that I, BENJAMIN HARRY BEDELL, a subject of the King of Great Britain, residing at 41 and 42 Hamilton House, Bishopsgate Street Without, London, England, have invented a new and useful Improved Collector for Use on Electrically Propelled or Lighted Vehicles, of which the following is a specification.

My invention relates to a new or improved collector of electric current for use on electrically propelled or lighted vehicles, locomotives, cranes, or other rolling-stock which receive electric energy from conductors of iron or other magnetic material set in or about the track upon which they run and which are either temporarily connected with a source of electricity as the vehicle passes them or are permanently so connected. The conductors may take the form of studs or discontinuous rails or of rails which are discontinuous only at crossings or other places.

Now my invention has for its object to enable a vehicle to collect an uninterrupted supply of electric current from discontinuous conductors, as above defined, without a short circuit occurring at places where uninsulated rails, access-boxes, or other exposed metallic surfaces cross, lie in, or are closely adjacent to the plane in which the collecting-surfaces of the conductors lie. This feature of my invention is of considerable advantage in connection with tramways and light railways worked by surface-contact systems, since it enables the studs or sectional rails from which the vehicles derive their current to be laid level with the road-surface without the collectors coming into contact with non-magnetic metals on the same level, whereas the collectors used and proposed to be used up to the present time have usually consisted of metallic brushes, runners, or skates, which would come into contact with the road-surface, and consequently with any metal, magnetic or otherwise, which might be situated upon it if it were not the custom when such collectors are used to raise the level of the studs above that of the road in order to avoid such undesirable contacts, these projecting studs being a serious objection to systems of which they form a part.

According to the invention I make my collectors of movable pieces of a magnetically-permeable metal or alloy, connected to the poles of a magnet carried by the car or the like in such a manner that when the poles are over studs or rails of magnetic material the collectors are magnetically attracted downward and caused to descend and make contact with such studs or rails, and if the latter be connected with a source of electricity will be capable of conducting current to motors and lamps upon the vehicle carrying the magnet. When, however, the magnet-pole is not immediately above a piece of magnetic metal, the collectors are drawn up, so that they do not touch or scrape along the road-surface or any non-magnetic conductor which may lie thereon.

Figure 2:
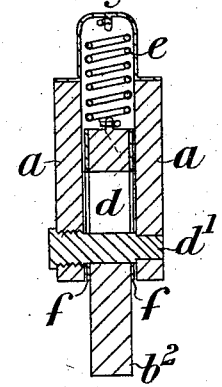
Figure 3:
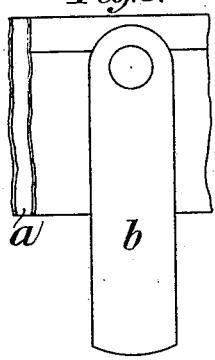
Figure 4:
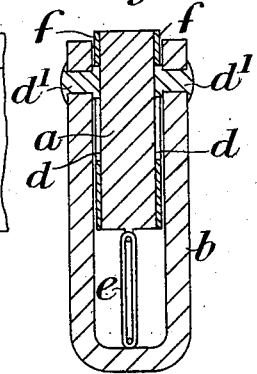
Figure 5:
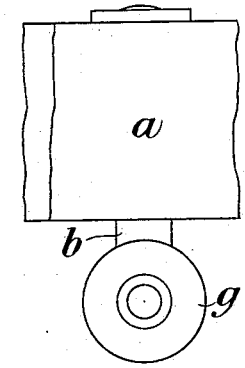
Figure 6:
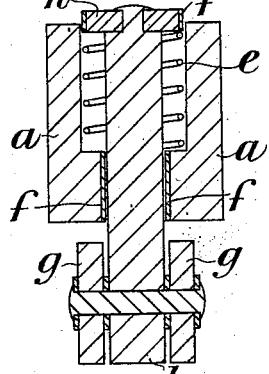
Figure 7:
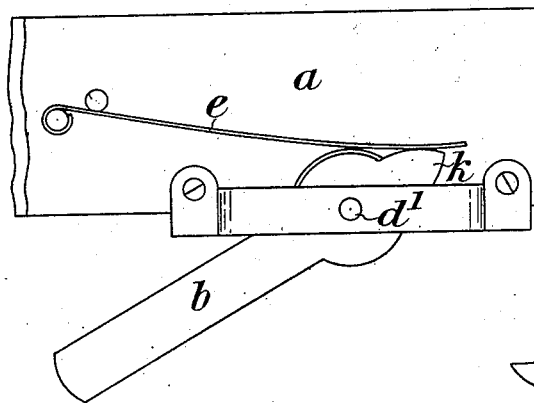
Figure 8:
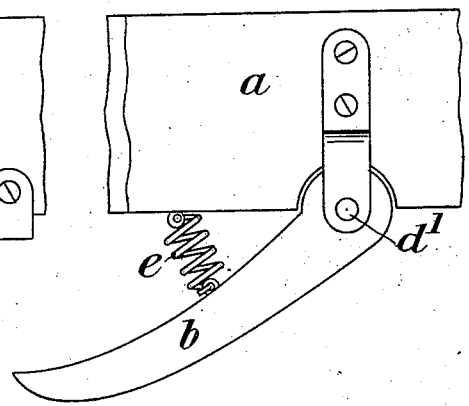

In the accompanying drawings, Figure 1 is a sectional side elevation of a portion of a magnet-pole having a suitable form of my improved collector applied thereto. Fig. 2 is a vertical transverse section thereof. Figs. 3 and 4 are views, similar to Figs. 1 and 2, of a modified construction of collector. Figs. 5 and 6 are also views, respectively, similar to Figs. 1 and 2, of a further modification. Figs. 7 and 8 are two views, similar to Fig. 1, of a still further modified construction of the collector. Fig. 9 is a side elevation showing the improvements adapted to a system of electric traction in which a switch is contained in a stud-box, the said switch being operated magnetically. Fig. 10 is a cross-section on the line 10 10, Fig. 9; and Fig. 11 is a view, similar to Fig. 9, showing the improvements adapted to a system in which a flexible conductor is picked up when current is to be supplied.

Referring first to the arrangement shown in Figs. 1 and 2, *a* represents the magnet-pole, which is here shown of hollow construction, and *b b' b²* are three collectors which are mounted upon the magnet-pole *a*. *c* is one of the conductor-studs, and the collector *b* is shown in position for taking current from the said stud. In this arrangement the collectors *b* are provided with slots *d*, through which pass pins *d'*, attached to the pole-piece *a*. The collectors are free to slide vertically and to rotate about the pins *d'* and are suspended from springs $e$ (or any equivalent device) for raising them when not attracted downward by a stud or rail of magnetic metal or alloy. $ff$ are plates of non-magnetic material inserted to prevent the magnetic material of the pole-piece $a$ coming into direct contact with that of the collectors $b$, as such direct contact would be liable to cause strong unbalanced magnetic attraction and consequent sticking between the moving and stationary parts.

In the construction illustrated in Figs. 3 and 4 the magnet-pole $a$ is of solid form, and the collector $b$ is of a U shape to adapt it to the pole-piece. Two pins $d'$ $d'$, fixed to the collector $b$, slide in slots $d$ $d$, provided for them in the non-magnetic plates $f$, fixed to each side of the pole-piece $a$. The collector $b$ is free to move vertically and also to swivel about the centers of the pins $d'$ $d'$ and is held in its near position to the pole $a$ by means of an elastic suspension $e$, except at such times as the collector is in the immediate vicinity of a magnetic stud or rail.

Figs. 5 and 6 illustrate a side elevation and a transverse section, respectively, of a collector $b$, suitable for mounting on a pole-piece $a$ of heavy section. The collector $b$ is preferably of rectangular section and is free to slide vertically in a hole provided for it in the pole-piece $a$, the top being provided with a flange or washer $h$, which bears on a spring $e$. This spring is compressed and allows the collector $b$ to descend when attracted downward by the presence of a magnetic stud or rail. Wheels $g$ are preferably mounted on this collector to enable it to more easily surmount small obstructions which it may encounter and to relieve wear.

Fig. 7 shows a form of my collector in which a swiveling motion only is provided, the collector $b$ moving downward when attracted by a stud or rail, and thus being enabled to make contact with it. A spring $e$, bearing upon a cam-shaped projection $k$, provides the restorative force, the said spring acting equally in whichever direction the collector $b$ is inclined, which depends upon the direction of motion of the car.

In Fig. 8 I have illustrated a simpler form of the collector shown in Fig. 7, which I adapt when the car is required to travel in one direction only. In this arrangement the collector is simply pivoted to the pin $d'$ and is normally held in the position indicated by the spiral spring $e$.

The collectors can be made of iron, steel, or other magnetic metal or alloy, either solid or laminated, and it will be understood that in moving outward from the magnet-pole, so as to make contact with a magnetic stud or rail, the reluctance of the magnetic circuit of which the collectors form a part is reduced by such motion, and hence a resultant magnetic attraction exists between the collectors and the studs when in their immediate vicinity, which resultant force is made use of to produce the motion of the collectors toward the studs or rails against the weaker restorative force derived from the spring, elastic substance, or magnetic pull provided for restoring the collectors to their near position to the magnet-pole when no stud or rail is in their immediate vicinity.

The core and windings of the magnet used in connection with the collectors form no part of the invention and may take any of the usual forms employed in surface-contact systems where a magnet is used for working switches or equivalent devices.

To enable the action of my device to be more clearly understood, I have shown the improvements in Figs. 9, 10, and 11 adapted to two systems of electric traction. In the arrangement shown in Figs. 9 and 10 the improvements are illustrated as applied to a system of traction in which a number of stud-boxes are employed, each stud-box containing a switch (indicated at $c'$ in Fig. 10) adapted to be operated magnetically. A well-known system of this kind is the Lorrain. Fig. 10 illustrates clearly the direction of the magnetic circuit. Fig. 11 shows the improvements applied to a system of traction in which a flexible conductor (indicated at $c^2$) is picked up to the studs as the magnet passes over the same. A well-known system of this description is the Linneff. The construction of stud-boxes and conductors used in the systems just referred to form no part of my invention and will not be particularly described herein. It is to be understood, however, that the improvements are applicable to other systems, as clearly set forth in the preamble to the specification.

The whole or part of the collectors may with advantage be of laminated construction when their motions are required to be very rapid, owing to a high speed on the vehicle carrying the magnet or to studs placed at intervals or to any other circumstance requiring rapid variations in the magnetic flux passing through the collectors. Furthermore, any one of the forms of collector can be provided with bearing-rollers, as in the arrangement shown in Figs. 5 and 6.

What I claim, and desire to secure by Letters Patent, is—

1. A collector for electrically propelled or lighted vehicles consisting of a piece of magnetic material movably mounted on the pole-piece of a magnet so that in moving outward to collect current from the studs or rails it decreases the magnetic reluctance of the magnetic current of which it forms a part, and of means for normally holding the said collector toward the pole-piece, substantially as, and for the purpose hereinbefore described.

2. In electric-traction systems the combination with the pole-piece of a magnet, of a collector which is movably mounted with respect to the said pole-piece and of a spring in connection with the collector and pole-piece which said spring normally holds the collector toward the pole-piece, substantially as described.

3. In electric-traction systems the combination with the pole-piece of a magnet, of a collector which is fitted thereto in such a manner that it can move vertically and of a spring for normally holding the collector in its innermost position with respect to the pole-piece, substantially as described.

4. In electric-traction systems the combination with the pole-piece of a magnet, of a slotted collector, of a pin mounted in the pole-piece and which engages the slotted end of the collector and of a spring for normally holding the collector in its innermost position, substantially as hereinbefore described.

5. In electric-traction systems, the combination with the pole-piece of a magnet, of a collector movably mounted with respect thereto, of means such as a spring for normally holding the collector toward the pole-piece and of plates of non-magnetic material inserted between the collector and the pole-piece, substantially as described.

6. In electric-traction systems, the combination with the pole of a magnet, of a collector movably mounted with respect thereto, of a spring in connection with the pole-piece and collector and of one or more rollers upon the contact end of the collector, substantially as hereinbefore described.

7. In electric-traction systems the combination with the pole-piece of a magnet, of a collector movably mounted with respect thereto, of means such as a spring for normally holding the collector toward the pole-piece, of plates of non-magnetic material between the collector and the pole-piece and of one or more rollers upon the contact end of the collector, substantially as hereinbefore described.

8. In electric-traction systems, the combination with the pole-piece of a magnet, of a collector pivoted to the said pole-piece and of a spring for normally holding the collector toward the pole-piece, substantially as hereinbefore described.

BENJAMIN HARRY BEDELL.

Witnesses:
JOHN E. BOUSFIELD,
C. G. REDFERN.